INVENTORS
NORBERT L. KUSTERS
MALCOLM P. MACMARTIN
BY J. R. Hughes
AGENT

PRIMARY WINDING 3
SECONDARY WINDING 4
MAGNETIC SHIELD 15
ELECTROSTATIC SHIELD 19
MAGNETIC CORE 11
MODULATION-DETECTION 13
    WINDING
MAGNETIC CORE 12
MODULATION-DETECTION 14
    WINDING

INVENTORS
NORBERT L. KUSTERS
MALCOLM P. MACMARTIN
By J. R. Hughes
AGENT

United States Patent Office 3,500,171
Patented Mar. 10, 1970

3,500,171
SELF-BALANCING CURRENT COMPARATOR FOR PRECISE VOLTAGE LEVELS AND POTENTIOMETER USAGE
Norbert L. Kusters and Malcolm P. MacMartin, Ottawa, Ontario, Canada, assignors to Canadian Patents and Development Limited, Ottawa, Ontario, Canada, a corporation of Canada
Filed Nov. 9, 1967, Ser. No. 681,779
Claims priority, application Canada, Jan. 6, 1967, 979,753, Patent 804,155
Int. Cl. G05f 1/50; G01r 17/02; H02j 1/04
U.S. Cl. 323—6         7 Claims

ABSTRACT OF THE DISCLOSURE

Apparatus for providing a stepped series of precise direct current or voltage levels in which a direct current comparator which has its primary connected to a source of constant direct current incorporates a detector for detecting zero flux in the core of the comparator and controlling a variable source of direct current connected to the secondary to provide the correct current value to give ampere turn balance at the comparator. The primary or secondary or both of the windings have predetermined tapping points to give a series of current levels directly related to the primary current in the secondary. To achieve a potentiometer device, the secondary is connected to a resistor having a constant resistance value and providing across its terminals a series of stepped voltage levels.

---

Figure 1:
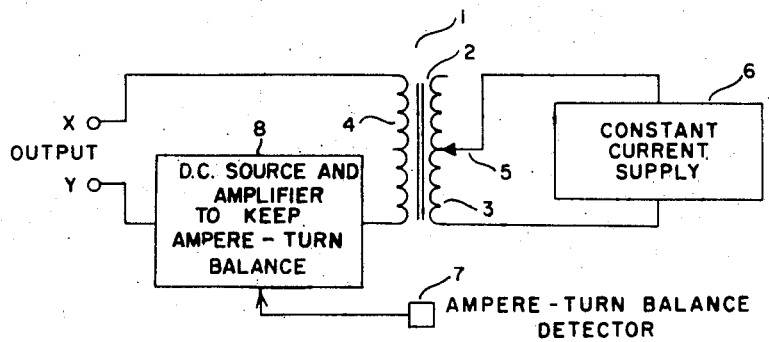

This invention relates to apparatus for providing a stepped series of precise, predetermined direct current values and more particularly to a potentiometer device based on such apparatus.

An ideal potentiometer is an instrument whose output voltage is a linear function of the dial settings. This can be achieved either by passing a constant current through a linearly varying resistance or by passing a linearly varying current through a constant resistance. All present day potentiometers depend on resistance ratios for linearity and for precision instruments, great care must be taken in their manufacture. Such devices are subject to errors caused by contact resistances, induced thermal E.M.F.'s temperature change effects, and other factors. In addition, the calibration and re-calibration of the present day potentiometers involve procedures that require great care and considerable time in their being carried out effectively. It is well known that resistance drift with time so that adjustments made at time of manufacture will not be necessarily correct at time of use. This means that potentiometers based on resistance ratios must be recalibrated at frequent intervals.

The current comparator is an ampere-turn balance indicator based on the detection of the zero flux condition in a magnetic core. For alternating current operation the detector consists of a single magnetic core with a uniformly distributed detection winding; for direct current operation, some other means for detection of the zero flux condition must be used. One convenient way of achieving this is to employ a two-core magnetic modulator as the ampere turn balance detector. A direct current comparator of this general type is described in a paper "A Current Comparator for the Precision Measurement of D.C. Ratios," by N. L. Kusters, W. J. M. Moore, and P. M. Miljanic in Communications and Electronics, January 1964; in "A Self-Balancing Direct Current Comparator for 20,000 Amperes," by M. P. MacMartin and N. L. Kusters in the IEEE Transactions on Magnetics, vol. Mag–1, No. 4, December 1965; and in "A Direct-Current-Comparator Ratio-Bridge For Four-Terminal Resistance Measurements" by M. P. MacMartin and N. L. Kusters, IEEE Transactions on Instrumentation and Measurements, vol. IM–15, No. 4, December 1966. Other methods of zero flux detection may be used, for example, Hall-effect devices, but generaly speaking the two core modulator technique has been found to be the most convenient.

It is an object of the present invention to provide an apparatus based on the direct current comparator for providing a stepped series of precise, predetermined direct current values.

It is another object of the invention to provide an apparatus capable of producing a linearly varying stepped series of precise current values where each current value is a precise fractional or multiple proportion of a single precisely controllable current.

It is another and more specific object of the invention to provide a potentiometer based on a modified form of the direct current comparator.

It is another object of the invention to provide a potentiometer device whose voltage levels are not dependent on resistance ratios but on turns ratios which do not vary with time and do not require laborious and time consuming adjustments.

These and other objects of the invention are achieved by a device based on the D.C. comparator of the type having a primary and secondary winding wound on a magnetic core and means for detecting zero flux condition in the core wherein one of the windings is provided with a series of tapping points at predetermined locations in the winding, the primary winding is adapted to be energized from a constant current source, the means for detecting zero flux condition in the core is controllably connected to a current source connected into the secondary current and adapted to provide a current in the secondary winding of the correct value to give ampere-turn balance between primary and secondary of the comparator. With the ampere-turn balance condition existing, the current flowing in the secondary is directly and precisely related to the primary current in terms of the turns ratio in the comparator. The tapping points allow the changing of this ratio such that a series of discrete current levels can be obtained. If the output current is applied to a single constant resistance a voltage output is obtained.

Figure 2:
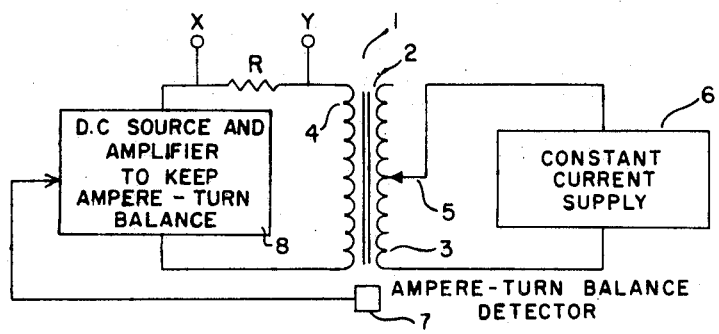
Figure 3:
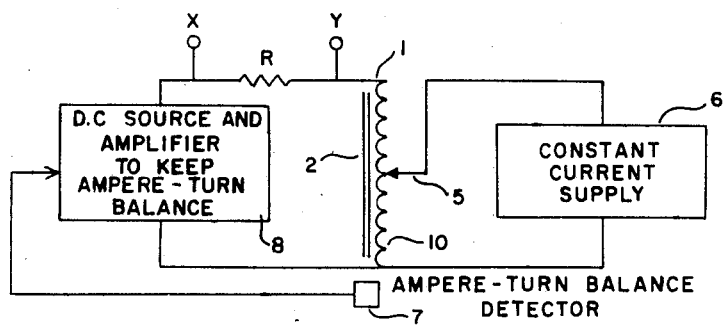
Figure 4:
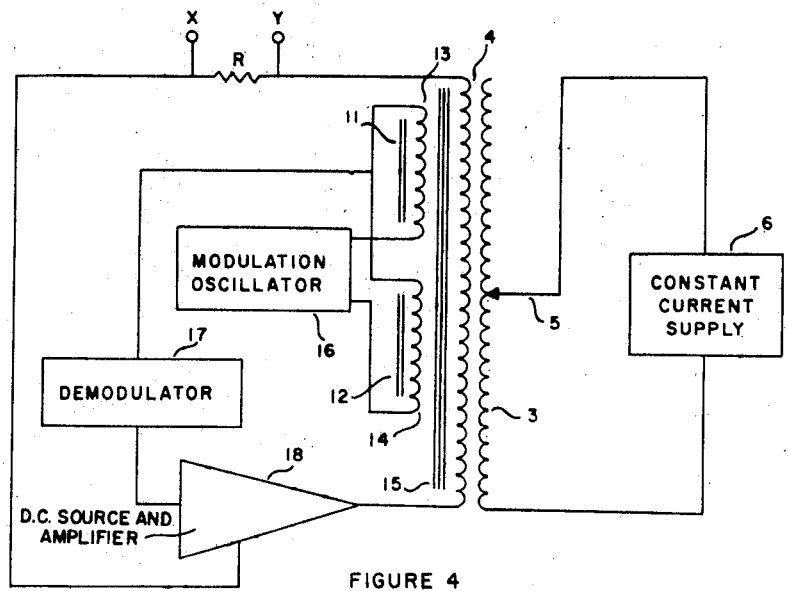
Figure 5:
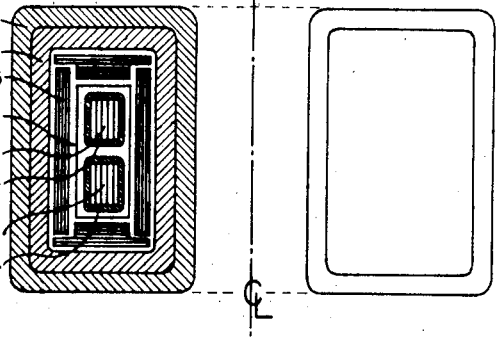

In drawings which illustrate embodiments of the invention,

FIGURE 1 is a block diagram circuit which provides a stepped series of current values, FIGURE 2 is a block diagram circuit of a potentiometer device based on a double winding current comparator, FIGURE 3 is a block diagram circuit of a potentiometer device based on a single winding current comparator, FIGURE 4 shows a more detailed version of the device of FIGURE 2 and where the ampere balance detector is a double core magnetic modulator, and FIGURE 5 is a diagrammatic cross-section of the direct current comparator device showing a possible arrangement of the windings, shields, magnetic cores, and taps.

Referring to FIGURE 1, a direct current comparator indicated generally at 1 comprises a magnetic core 2 on which is wound a primary winding 3 of $N_1$ turns. This winding is tapped at points in the winding such that a series of predetrmined or equal steps (fractions of the total number of turns $N_1$) is provided preferably from zero to maximum. A fraction of the turns on winding 3 determined by the position of current tap 5 receives a constant current supply $I_1$ from a conventional constant current source 6 which may be readily monitored with the aid of a standard cell. A secondary winding 4 of $N_2$ turns is also wound on core 2 and is connected to the output points X and Y through an amplifier 8 which supplies a current $I_2$ in the secondary such that $N_2I_2 = XN_1I_1$ where X is the fraction of the total number of turns in the primary in which $I_1$ is flowing. This condition exists when and only when there is zero flux in core 2. A zero flux detector 7 controls direct current source and amplifier 8 such that the proper current is provided in the secondary to give ampere-turn balance at the comparator. It will be realized that an output current that is a precise fraction (or multiple) of input current $I_1$ is obtained and that a series of discrete, precise current levels, not dependent on resistance ratios for their determination but on turns ratios which by their very nature are precise, is obtainable.

The series of current steps can be made linear from zero to maximum or between other predetermined levels as desired and if applied to a constant resistance, a voltage output is obtained making a most effective potentiometer. FIGURE 2 shows such a system wherein the current is applied across a constant resistance R to give a series of precise voltage levels at output points X and Y.

FIGURE 3 shows a variation of the device of FIGURE 1. In this case only a single winding 10 is used and is tapped at 5 in the manner of an auto-transformer. Single winding 10 is used as both primary and secondary in this version.

FIGURE 4 shows the device of FIGURE 2 in more detail and illustrates a convenient method of detecting ampere-turn balance (zero-flux) in the comparator. Primary winding 3 supplied from constant current source 6 as before and secondary winding 4 are wound on two magnetic cores 11 and 12 on which are wound modulation-detection windings 13 and 14 respectively. A suitable magnetic shield is interposed between the sets of windings. A modulator oscillator 16 supplies a square wave modulation current to the modulation windings which sets up A.C. flux in the cores 11 and 12. With zero D.C. flux in the cores there will be no imbalance and no error detected by phase sensitive demodulator 17. Any departure from zero D.C. flux will result in an imbalance and a signal applied to direct current source and amplifier 18 which acts to bring the current in winding 4 to the correct value to achieve balance. This self-balancing feature of the circuit is described in more detail in the second of the three papers mentioned above. The current flowing in the secondary is applied across constant resistance R to give a voltage output at points X and Y.

FIGURE 5 illustrates a method of constructing the modified current comparator used in this invention. The two magnetic cores 11 and 12 which are preferably toroids of laminar magnetic material are positioned in close or side-by-side relationship each having their respective modulation-detection windings 13 and 14 wound thereon. Electrostatic shield 19 surrounds these windings and a magnetic shield 15 encompasses both inner cores and their windings. Secondary and primary windings 4 and 3 are wound over the magnetic shield which is used to cut down or prevent the effect on the cores of leakage fluxes resulting from the currents in the primary and secondary windings. The primary winding is tapped at predetermined locations and a suitable dial arrangement (not shown) may be used.

In the above description, the device is described with tapping points shown only on the primary. In actual practice tapping points would be used on both windings not only for purposes of changing the turns ratio but also for adjusting and cancelling system errors.

Certain variations in the arrangements described above will suggest themselves to those in this field. Another form of zero flux detector that might be used would be a magnetometer-type, see for example "A Saturated Core Recording Magnetometer" by D. C. Rose and J. N. Bloom, Canadian Journal of Research A, 28:153-163, March 1950. In the device illustrated in FIGURE 4, windings 13 and 14 act as both modulation and detection windings: in some cases it might be more convenient to separate these functions and provide separate windings for each function. In addition, in the above description the device for providing the correct balancing current in the secondary is indicated as an amplifier. Any controllable current source may be used.

The embodiments of the invention in which an exclusive property or privilege is claimed are defined as follows:

1. Apparatus for providing a stepped series of precise direct current values comprising:
   (a) a direct current comparator of the type having a primary and secondary winding wound on a magnetic core and means for detecting zero flux in the core,
   (b) current tapping points at predetermined locations on at least one of said windings to change the effective turns ratio between primary and secondary windings,
   (c) a source of constant direct current connected to said primary,
   (d) a source of direct current connected to said secondary, and
   (e) control means connected between said means for detecting zero flux and said source of direct current adapted such as to cause said source to provide the correct current value to the secondary to give ampere turn balance at the comparator, said current being directly related to the current in the primary in terms of the effective turns ratio between primary and secondary windings.

2. Apparatus as in claim 1 adapted for use as a potentiometer wherein said secondary current is applied to a constant resistance giving a stepped series of precise voltages at the output.

3. Apparatus as in claim 1 wherein the means for detecting zero flux in the core of the comparator is a double core modulator.

4. Apparatus as in claim 1 wherein the said current tapping points are chosen to give a linearly varying stepped series of direct current values in the secondary.

5. Apparatus as in claim 1 wherein the magnetic core is in the form of two separate magnetic cores positioned in close relationship and the means for detecting zero flux in the core comprises modulation-detection windings on each of said magnetic cores, oscillator means connected to said modulation-detection windings for setting up an alternating flux in said cores, and detector means connected to said modulation-detection windings for detecting imbalance in the alternating flux in the cores due to departures from the zero direct flux condition and providing a control signal to said source of direct current connected to the secondary.

6. Potentiometer apparatus for providing a stepped series of precise voltages comprising:
   (a) a direct current comparator of the type having a primary and a secondary winding wound on a double magnetic core,
   (b) a double core modulator for detecting zero flux in the magnetic core,
   (c) current tapping points at predetermined locations on at least one of said windings to change the effective turns ratio between primary and secondary windings,
   (d) a source of constant direct current connected to said primary,
   (e) a source of direct current connected to said secondary,
   (f) control means connected between the double core modulator and said source of direct current adapted to cause said source of direct current to provide the correct current value to the secondary to give ampere turn balance at the comparator, said current being directly related to the current in the primary in terms of the effective turns ratio between primary and secondary windings, and
   (g) a resistor having a constant resistance value connected to said secondary to provide across its terminals a stepped series of precise voltage levels.

7. Potentiometer apparatus as in claim 6 wherein the said current tapping points are chosen to give a linearly varying stepped series of voltage levels across the said resistor.

References Cited

UNITED STATES PATENTS 2,760,158　8/1956　Kerns _____ 324—117 X

OTHER REFERENCES

"Self-Balancing Current Comparator" by Peterson, IEEE Trans. on Instrumentation and Measurement, vol. IM-15, Nos. 1/2; March/June 1966 (pp. 62–71).

LEE T. HIX, Primary Examiner

G. GOLDBERG, Assistant Examiner

U.S. Cl. X.R.

323—43.5, 54; 324—98, 117